United States Patent [19]
Freedman

[11] Patent Number: 5,859,902
[45] Date of Patent: *Jan. 12, 1999

[54] METHOD FOR PROCESSING COLLECT CALLS

[75] Inventor: Barry H. Freedman, Holmdel, N.J.

[73] Assignee: AT&T Corp, Middletown, N.J.

[*] Notice: The term of this patent shall not extend beyond the expiration date of Pat. No. 5

[21] Appl. No.: 851,794

[22] Filed: May 6, 1997

Related U.S. Application Data

[63] Continuation of Ser. No. 603,525, Feb. 21, 1996, Pat. No. 5,627,887, which is a continuation of Ser. No. 324,942, Oct. 18, 1994, abandoned.

[51] Int. Cl.$^6$ ............ H04M 17/00; H04M 15/00; H04M 15/06; H04M 1/64
[52] U.S. Cl. ............ 379/144; 379/70; 379/88.16; 379/127; 379/114; 379/142
[58] Field of Search .................. 379/112, 114, 379/115, 119, 120, 121, 127, 143, 144, 130, 131, 140, 141, 142, 201, 67, 70, 88.01, 88.16, 149

[56] References Cited

U.S. PATENT DOCUMENTS

| | | | |
|---|---|---|---|
| 4,797,910 | 1/1989 | Daudelin et al. | 379/67 |
| 4,933,966 | 6/1990 | Hird et al. | 379/132 |
| 4,935,956 | 6/1990 | Hellwarth et al. | 379/112 |
| 5,003,584 | 3/1991 | Benyacar | 379/119 |
| 5,043,983 | 8/1991 | Dorst et al. | 370/110.1 |
| 5,093,858 | 3/1992 | Hird et al. | 379/132 |
| 5,185,781 | 2/1993 | Dowden et al. | 379/67 |
| 5,210,789 | 5/1993 | Jeffus et al. | 379/127 |
| 5,287,403 | 2/1994 | Atkins et al. | 379/144 |
| 5,627,887 | 5/1997 | Freedman | 379/114 |
| 5,719,927 | 2/1998 | Hariu et al. | 379/114 |

OTHER PUBLICATIONS

N. X. DeLessio et al., "An Integrated Operator Services Capability for the 5ESS System," Session 22C, Paper No. 3, *XI International Switching Symposium*, May 1984, pp. 1–5.

Primary Examiner—Paul Loomis
Attorney, Agent, or Firm—Barry H. Freedman

[57] ABSTRACT

When a collect call is initiated by a calling party, and the call is routed to an operator services position, an automated attendant, or other system in the telephone network. In addition to playing an announcement to the called party to determine if he or she will accept the call, information is furnished to the called party, preferably by an announcement, indicating (a) the anticipated cost for the call, and, optionally, (b) the relative cost of the call, as compared to the cost that would be imposed if another carrier carried the call. This information may be obtained using the dialed number and information identifying the calling party location, and by querying a database containing (a) rate information, and optionally (b) comparative information setting forth the rates of different carriers offering collect call service in the same calling area. The invention can be practiced in an automated attendant, sometimes referred to as an interactive telecommunications services platform, which may be part of (a) a switch in a local exchange network, or (b) a switch in an interexchange (long distance) network. The collect calls may be originated by dialing a 0+ call, or by calling a predetermined 800 number such as 1-800-CALL ATT.

3 Claims, 2 Drawing Sheets

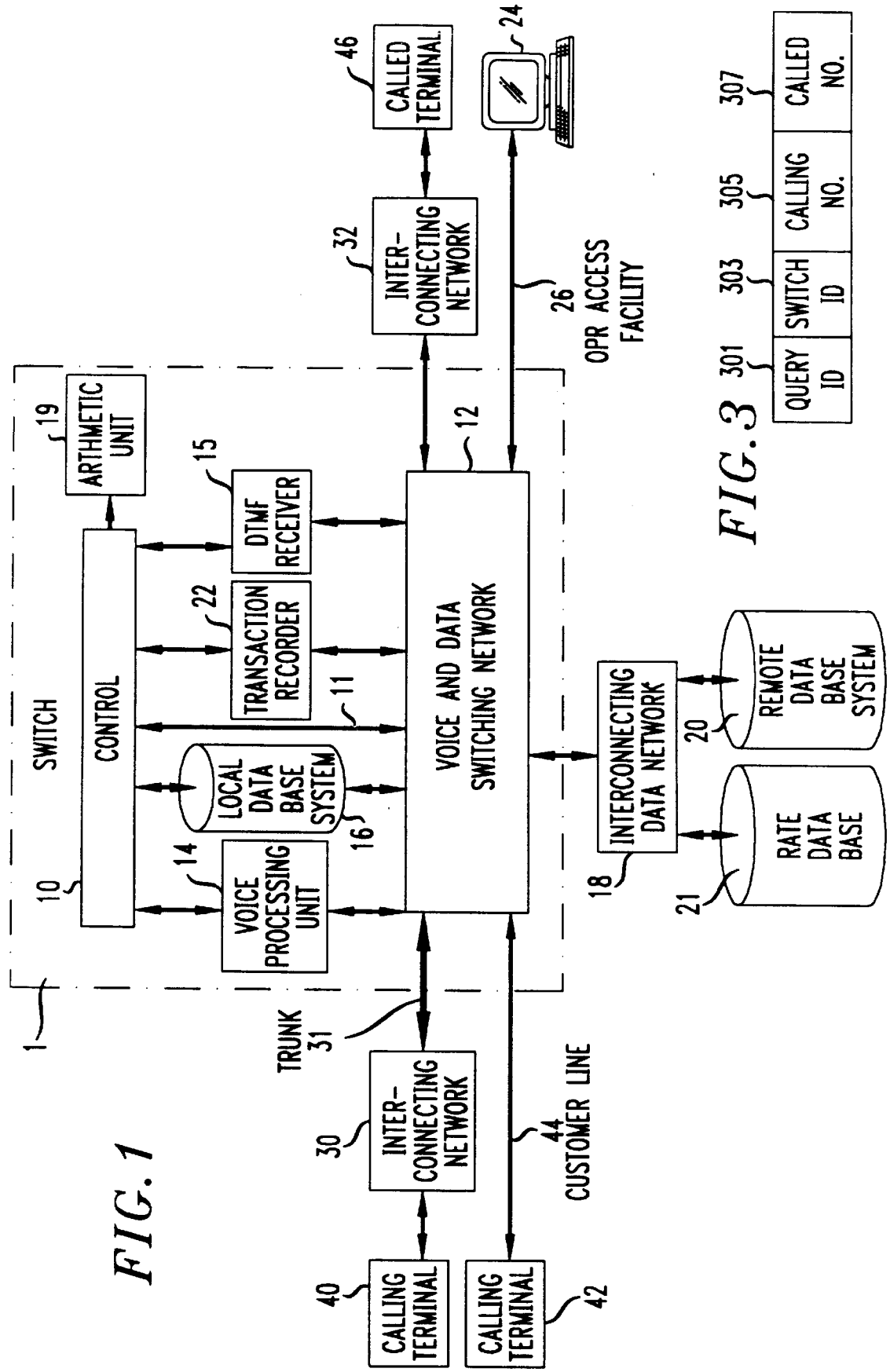

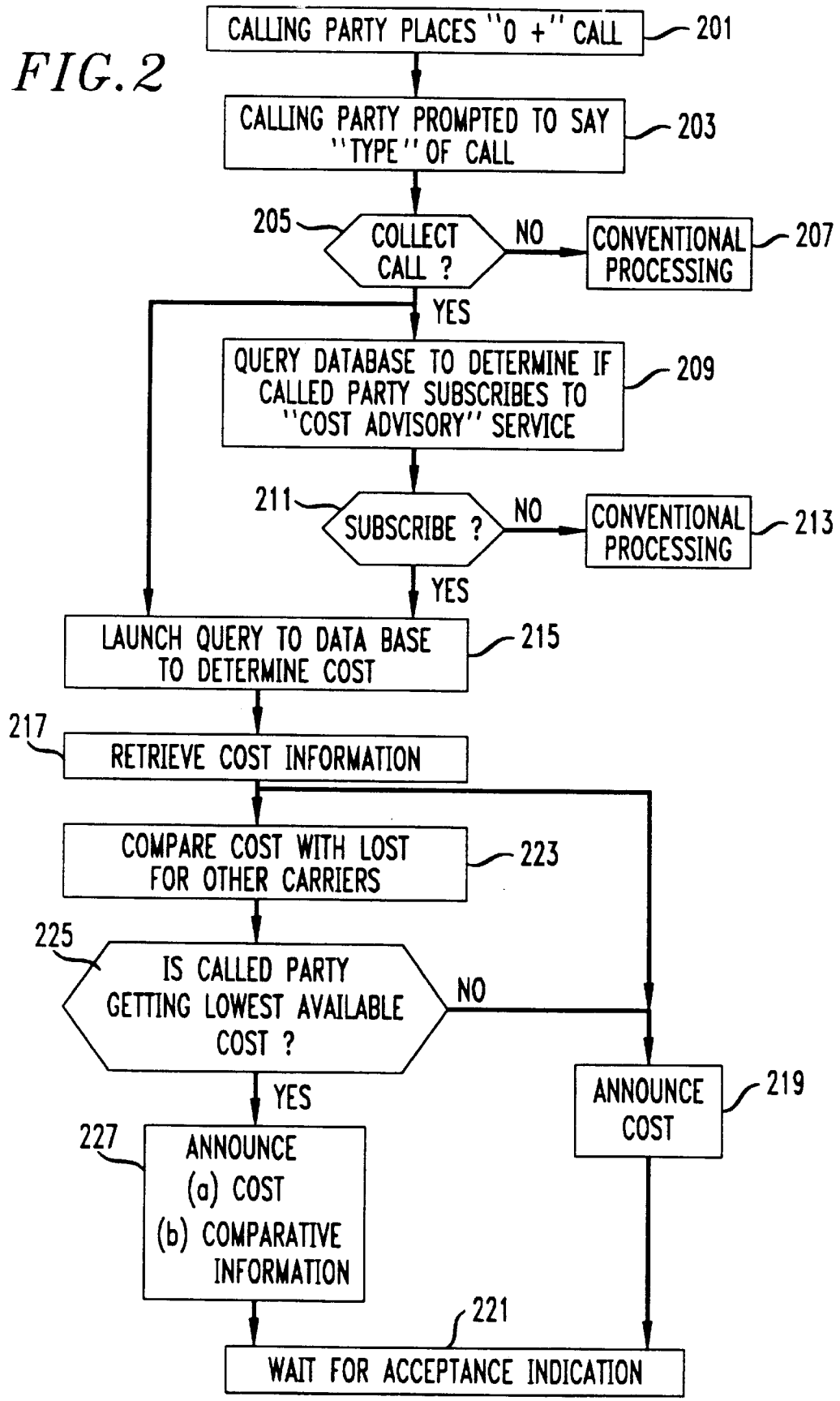

METHOD FOR PROCESSING COLLECT CALLS

CROSS REFERENCE TO RELATED APPLICATIONS

This application is a continuation of application Ser. No. 08/603525 filed on Feb. 21, 1996, now U.S. Pat. No. 5,627,887 which is a continuation under Rule 1.62 of application Ser. No. 08/324942 filed on Oct. 18, 1994, now abandoned, incorporated herein by reference.

FIELD OF THE INVENTION

This invention relates generally to a method for processing collect telephone calls, and, in particular, to providing to the called party receiving a collect call, information relating to the charges for the call as well as other related information.

BACKGROUND OF THE INVENTION

Various regulatory and technological developments have opened competition in the field of both local and long distance collect calls. The traditional method of initiating a collect call is to dial "0" plus the desired telephone number, and this call will be carried by the local exchange carrier (LEC) in the case of a local call, and by the interexchange carrier (IXC) to which the called party subscribes, in the case of a long distance call. To route the call using a particular long distance carrier, it is possible to prefix a collect call with an access code, such as 10288 in the case of AT&T. A further alternative is to make the collect call by dialing a predetermined toll free number, such as 1-800-CALL-ATT or 1-800-OPERATOR.

What is common to all of these variants is the fact that the calling party now has a choice of the carrier that will carry a collect telephone call, but the called party, who will pay for the collect call (if the call is accepted as a collect call) has no choice, and indeed, little or no advance information about the call.

SUMMARY OF THE INVENTION

Currently, a collect call is initiated by a calling party, and the call is routed to an operator services position, an automated attendant, or other system in the telephone network which plays an announcement to the called party to determine if he or she will accept the call. In accordance with the present invention, in addition to this announcement, a process is initiated in order to furnish information to the called party indicating (a) the anticipated cost for the call, and, optionally, (b) the relative cost of the call, as compared to the cost that would be imposed if another carrier carried the call. The information may be obtained, for example, by querying a database containing (a) rate information, and optionally (b) comparative information setting forth the rates of different carriers offering collect call service in the same calling area. The query may be formulated using the dialed number and information identifying the calling party location. After the cost information is obtained, it may be furnished to the called party in the form of a voice announcement generated by a voice response system, or by an attendant.

The present invention can be practiced, in exemplary embodiments, in an automated attendant, sometimes referred to as an interactive telecommunications services platform, which may be part of (a) a switch in a local exchange network, or (b) a switch in an interexchange (long distance) network. The collect calls processed by the present invention may be initiated as 0+ calls, or as collect calls placed to a predetermined 800 number such as 1-800-CALL-ATT.

By virtue of the present invention, the called party now has information on which to base a decision to accept the collect call, since he or she is apprised of the anticipated cost for the call, and, optionally, the relative cost of the call. Based on this, a called party may be motivated to accept calls that would otherwise be refused, for example, if the called party is notified that this call will be billed at the least expensive rate possible from any carrier, or may decide to may decide to refuse a collect call because it will be too expensive. Alternatively, a called party may decide to accept a collect call notwithstanding the estimated or relative cost, but may use the information tell the calling party that the next time a collect call is made, a different carrier should be used.

BRIEF DESCRIPTION OF THE DRAWING

The present invention will be more fully appreciated by consideration of the following detailed description, which should be read in light of the accompanying drawing, in which:

FIG. 1 is a block diagram of a system in which the present invention may be practiced, for completing collect calls from a calling party to a called party, and for playing an announcement to the called party, giving the called party information about the cost of the call;

FIG. 2 is a flow diagram illustrating the process followed in the system of FIG. 1, when a collect call is initiated; and FIG. 3 illustrates the format of the query message sent from switch 1 to database 20 or 21 of FIG. 1.

DETAILED DESCRIPTION

Referring first to FIG. 1, there is shown a block diagram of a system in which the present invention may be practiced, for completing collect calls from a calling party located at a calling terminal 40 or 42 to a called party located at called terminal 46. When properly configured and programmed, as explained below, the system may be arranged to play an announcement to the called party, typically before the called party decides to accept the call, giving the called party information about the cost of the call. Many of the elements shown in FIG. 1 are the same as those shown in FIG. 1 of U.S. Pat. No. 4,797,910 issued to Daudelin et. al on Jan. 10, 1989 and assigned to the same assignee as the present invention, which is incorporated herein by reference. For convenience, the elements shown in FIG. 1 retain the same reference designations as in the Daudelin et. al patent. It is also noted that the present invention can be carried out using the apparatus described in U.S. Pat. No. 4,933,966 issued to Hird et. al on Jun. 12, 1990, and in U.S. Pat. No. 5,093,858, issued Mar. 3, 1992, which is a continuation thereof, when that apparatus is properly modified, configured and programmed, as explained herein. Reference is also made to U.S. Pat. No. 5,043,983, issued to Dorst et. al on Aug. 27, 1991, and to U.S. Pat. No. 5,287,403, issued to Atkins et. al on Feb. 15, 1994, both assigned to the same assignee as the present invention, which each also disclose an environment in which the present invention may be practiced.

The context of the arrangement shown in FIG. 1 is the processing of collect calls by a local exchange carrier (LEC). However, as explained below, it is to be understood from the outset that the present invention is also applicable to collect calls processed by an interexchange carrier (IXC) such as AT&T.

Switch 1 is an electronic program controlled switch such as AT&T's 5ESS® electronic switch, arranged to offer the Operator Services Position System (OSPS) features. The 5ESS switch is described, for example, in *AT&T Technical Journal*, volume 64, No. 6, Part 2, pages 1305–1564, and the OSPS feature is described, for example, in Paper 3, Session 22C presented at the International Switching Symposium in May, 1984.

Within switch 1 are various functional elements or blocks for carrying out the functions of a telecommunications switch. Control 10 is a distributed control system operating under the control of a group of data and call processing programs to control various blocks of the switch. In order to practice the present invention, the operator services control programs must be augmented by the programs described in the flow charts of FIGS. 2 and 3, discussed more fully below. Voice and data switching network 12 is capable of switching voice and/or data between inputs connected to the switching network. This element, which is sometimes referred to as a "switch fabric", is directly connected to control 10 via a control access 11. Also connected to network 12 is a DTMF receiver 15, which can receive and interpret dual tone multi-frequency inputs entered by a person using a touch-tone keypad, and an automatic voice processing system, voice processing unit (VPU) 14. The CONVERSANT® Voice Response System, manufactured by AT&T can be used to carry out the functions of voice processing unit 14.

Voice processing unit 14 receives input signals which may be (a) control signals generated by the program operating in control 10, (b) voice signals routed to the VPU from the calling party or the called party, or (c) dual tone multifrequency (DTMF) signals which may be keyed in by the calling party or the called party. VPU 14 has numerous logic and control capabilities, which include, among other things, the ability to analyze the various input signals to distinguish among allowable DTMF signals and among the individual elements of a predetermined list of spoken responses. Voice processing unit 14 also has the ability to generate tone sequences and voice messages.

The voice messages generated in VPU 14 may prompt a customer to speak or enter information into the system for subsequent recognition by the voice processing unit. The voice messages may also provide announcements in connection with a call, such as by speaking pre-stored words or phrases to the called party. In accordance with an aspect of the present invention, the prestored phrases include a series of numbers which together can advise the called party as to the anticipated cost (e.g., in dollars and cents) of a collect call, and optionally a series of words which together can inform the called party as to the relative cost of the call (e.g., by ranking the cost as compared to other carriers).

In addition, voice processing unit 14 may have the capability for recording a short calling party response for subsequent playback to a called terminal, such as indicating the name of the person making the collect call being spoken in their own voice. Such recordings can also be used to record acceptance of a collect call by the called party, and thereby serve as proof in the event of customer complaints.

Note also that voice processing unit 14 can generate output data signals, representing the results of the voice processing and the status of any prompts and announcements; these output signals are sent to control 10 and used as an input to the various programs that control the operation of the system. The same control signals can be used for controlling establishment of connections in switching network 12 and for generating displays for operator position 24.

Two types of data base systems are used by switch 1 in order to set up collect calls in conformance with the principles of this invention. First, a local data base system 16 is directly accessible by control 10 of switch 1 via switching network 12. Second, a remote data base system 20 is accessible to control 10 of switch 1 via switching network 12 and an interconnecting data network 18. Local data base system 16 is typically used for storing information relating to subscribers that are served by switch 1, such as subscriber profiles. In accordance with the present invention, announcements of the type contemplated herein, namely the anticipated absolute and relative cost of a collect call, may only be provided with respect to certain collect calls. The particular collect calls that are selected to receive announcements may be determined as a function of called party, calling party or other information stored in the profiles in data base system 16.

Remote data base system 20 is typically used for storing data that is shared by many switches, and in the context of the present invention, would be the repository for comparative cost information relating to collect calls. For example, remote data base system 20 might store data pertaining to the charges imposed by various telecommunications providers, organized in a matrix according to called and calling location. Interconnecting data network 18 can be any well known data network and specifically could be a common channel signaling system such as the international standard telecommunications signaling system CCS7.

In addition to or in lieu of data base system 20, a separate rate data base 21 may be used in conjunction with the present invention. This data base is one that is used in connection with the "rating" of telephone calls, a process wherein charges for a particular telephone call are determined, based for example upon the length of a call and the rate per unit time, so that the charges can be applied to the appropriate bill. Rate data base 21 may be operated by a separate entity, and loaded with rate information based upon applicable tariffs. It is within the contemplation of the present invention that rate data base 21 may be queried for rate information with respect to an individual call, or alternatively, tables or matrices of rate information may be periodically downloaded from rate data base 21 to remote data base system 20.

Transaction recorder 22 is used for recording data about calls for subsequent processing. This data typically is billing data which is subsequently processed by a billing processor in order to prepare bills. The transaction recorder is also used for recording traffic data for network monitoring and maintenance, and in order to control traffic dynamically.

Operator position 24 connected to switch 1 comprises a terminal for use by an operator in order to control operator assistance calls, including collect calls. Data displays for the terminal of operator position 24 are generated by control 10. Operator position 24 is connected to the voice and data switching network 12 by operator access facility 26, which may include carrier facilities in order to allow the operator position to be located remotely from switching network 12. Alternatively, operator access facility 26 may be a simple voice and data access facility, if the operator positions are located in close physical proximity to the switching network. Only one operator position is shown in FIG. 1, but it is understood that a typical switch, arranged to offer operator assistance services, has access to a large number of such operator positions.

Connected to switch 1 are interconnecting networks 30 and 32. Interconnecting network 30 connects calling terminal 40 to switch 1, while interconnecting network 32 connects called terminal 46 to switch 1. Calling terminal 42 is directly connected to switch 1 via communications line 44, while a trunk 31 extends between network 30 and switch 1. In the context now being discussed, namely, where switch 1 is a LEC switch, these interconnecting networks 30 and 32, as well as the other interconnecting facilities such as trunk 31, may be portions of the same LEC network, or, alternatively, networks 30 and 32 may be separate networks. Each of the networks 30 and 32 may include one or more switches and which are used for interconnecting voice and data signals between terminals 40, 42 and 46 and switch 1. Thus, in practice, interconnecting networks 30 and 32 may be parts of a much larger common carrier network. If the calling terminal is not directly connected to switch 1, it is assumed for the purposes of the following description that the directory number of the calling terminal, identified, for example, by automatic number identification, is transmitted from the switch in the interconnecting network (e.g., interconnecting network 30) that is connected to the calling terminal (e.g., terminal 40), to switch 1. This information is used to determine the location of the calling terminal, so that the cost of the collect call can be ascertained. Furthermore, it is to be understood that the architecture shown in FIG. 1 is illustrative only, and that, depending upon the locations of the calling and called parties, a particular call may traverse zero, one or two interconnecting networks.

The word "terminal" as used herein includes not only a simple telephone station, but also other station or terminal equipment with more elaborate features, such as a combination voice/data terminal, a computer terminal, or a terminal including an answering machine or a fax machine.

In order to illustrate the principles of the invention, the process followed in completing a collect call from calling terminal 42 to called terminal 46 will be described in conjunction with the flow diagram of FIG. 2. It is assumed that switch 1 is in a LEC office, and that the collect call is initiated by the calling party dialing a 0+ call, meaning the digits 0 followed by the desired 7-digit local number or 10-digit long distance number. The customer at a calling terminal 40 or 42 is referred to as a calling party or caller. In this example, the called party at terminal 46 wishes to be informed of the anticipated cost of the call, and the relative cost, compared to other collect call providers, when an incoming call is a collect call.

The process begins in step 201, when the caller at terminal 42 dials or enters "0", followed by the directory number of called terminal 46. The dialed number is transmitted over customer line 44, received in voice and data switching network 12, and passed to control 10 via DTMF receiver 15. (Calls from calling terminal 40 proceed similarly, but through interconnecting network 30 and trunk 31.) Control 10 analyzes the dialed number and recognizes that calling terminal 40 or 42 has placed some kind of operator assistance call, by virtue of the initial "0". In order to determine whether this is a calling card, bill to third party (third), person-to-person (person), collect, conference, billing or other operator assistance call, it is necessary to connect the calling customer at terminal 42 to voice processing unit 14. After this connection has been established, voice processing unit 14 returns a prompting message to calling terminal 42 in step 203, asking the calling party to indicate verbally if the call is collect, calling card, etc. (Alternatively, the prompting message may ask the calling party to indicate his or her choice by pressing a key on the caller's touch-tone keypad, thereby generating a DTMF signal that is received in DTMF receiver 15 and passed to control 10.)

In response to this prompt, a determination is made in step 205 as to whether the call is a collect call, or some other type of call requiring different treatment. This is done by analyzing the voice input, to determine if the calling party said "Collect" or one of the other predetermined phrases that are recognizable by VPU 14, (such as calling card, person, etc.), or by determining if the calling party pressed a key and thereby generated a DTMF signal indicative of a desire to place a collect call. Note that if the calling party fails to key in a command or to speak a command, he or she will be prompted by an announcement which says: "please say collect, calling card, person, third number" etc.

If a "NO" result is reached in step 205, indicating that the call is not a collect call, then processing proceeds conventionally, as indicated in step 207. Because the call is not being billed to the called party, there is no need to announce to the called party the anticipated charges nor to provide other billing information.

If a "YES" result is reached in step 205, indicating that the call is a collect call, then processing proceeds with an optional step 209, if the present invention is implemented on a "selective" basis, or with step 215, if the present invention is implemented on a "universal" basis. More specifically, when selective processing is invoked, as contemplated in step 209, a query is launched by switch 1 through interconnecting data network 18 to remote data base system 20, to determine if the called party, as identified by the directory number dialed by the calling party, has "subscribed" to the service provided by the present invention, and therefore desires (and is entitled) to receive information indicating the cost of the collect call. If the result of the query determined in step 211 is "NO", then conventional processing continues in step 213. On the other hand, if the result of the query determined in step 211 is "YES", then processing in the advantageous manner contemplated by the present invention continues with step 215. The "NO" determination may also occur in step 211 in the event that there is a failure to receive any response to the query within a predetermined time.

In step 215, while the connection to the called customer is being established, a query is launched by switch 1 to obtain the needed cost information. This query may be sent to remote data base system 20, if that data base contains information concerning the charges that will be imposed in connection with the call, or to a separate rate data base 21, that may be located elsewhere within or outside the communication network, if that database contains the desired information. The query message sent from switch 1 to database 20 or 21 may have the format illustrated in FIG. 3, such that field 301 contains an identification number unique to the query, field 303 contains switch identification information, so that the response to the query can be returned to the appropriate network element, in this case switch 1 and matched with the query ID, field 305 contains the calling terminal number, as obtained, for example, from ANI, and field 307 contains the called terminal number, as obtained from the dialed number.

Using the information contained in the query, which identifies the origination and endpoints for the call, database 20 or 21 is arranged to retrieve, in step 217, stored information indicative of the anticipated cost for the call. This information may have several components, such as an initial period charge and a subsequent period charge, or may be a flat rate per unit time, or some other variant thereof Advantageously, information in database 20 or 21 may be arranged and stored in a matrix format, so that the intersection of "vectors" specifying the starting and destination points for a call yield the desired information specifying the cost for the call.

Following completion of retrieval in step 217, the information specifying the anticipated cost of the call is returned to switch 1 and applied, via control 10 to VPU 14, so that the cost information may be announced to the called party at the appropriate time, in accordance with the principles of the present invention.

When called terminal 46 answers the call, the answer signal is transmitted back to switching network 12 and is passed to control 10 via control access 11. When control 10 receives this answer signal, control 10 sets up a connection in switching network 12 from voice processing unit 14 through interconnecting network 32 to called terminal 46. This is done so that in step 219, after a connection has been set up through interconnecting network 32 to called terminal 46, an announcement can be made to the called customer that this is a collect call. In addition, in accordance with the present invention, the cost information previously retrieved may be announced to the called party. If a collect call is being handled by a live attendant using operator position 24, then the retrieved cost information from step 217 may be displayed on the operator console, and announced by the attendant, rather than being announced by VPU 14. An exemplary announcement might be: "This is the AT&T network with a collect call from Jane. The call will cost thirty cents for the first minute, and ten cents per minute thereafter. Will you accept the charges?"

Next, in step 221, the system waits for and receives an indication as to whether the called party has chosen to accept or decline the collect call. Processing from this point forward is conventional, such that a declination is followed by termination of the calling process, while acceptance is followed by activation of the talk path between the calling and called parties and initiation of a billing record. Although not shown in FIG. 2, it may be desirable to reassure the calling party with appropriate announcements provided at different points of the process, and accordingly, it is contemplated that the calling party will receive various announcements from voice processing unit 14 while the call is being set up, to indicate that a collect call is being set up from his terminal to the called party. Note that this exemplary call has been established without requiring the services of an operator.

In an optional arrangement in accordance with the present invention, the rate information retrieved in step 217 may be compared in step 223 with cost information, also stored in database 20 or 21, relating to the charges that would be imposed for the same call by other carriers providing collect call service. This comparison is a simple arithmetic comparison that can be performed by the logic within VPU 14, or by a separate arithmetic unit 19 connected to control 10 in switch 1. If it is determined in step 225 that the called party will be paying the lowest available rate for the call, that fact may be announced to the called party, along with the rate information in step 225. An exemplary announcement might be: "This is the AT&T network with a collect call from Jane. You will be charged the lowest available rate for this call, which will be thirty cents for the first minute, and ten cents per minute thereafter. Will you accept the charges?" On the other hand, if the lowest rate is not being charged, only the rate information may be provided, by branching from step 225 directly to announcement step 219, previously described.

As indicated above, remote data base system 20 may contain data for called terminal 46, indicating if the called party has subscribed to the service provided by the present invention. It is to be understood that the same database may contain additional information relating to other characteristics of called customers, such as information with respect to what kinds of collect calls they will accept. For example, the query made in step 209 may indicate that the called customer will accept all collect calls, but nevertheless wishes to be informed that an incoming call is collect, and of the charges that will be imposed. Other parties may specify that they wish to decide that they want to know the name of the calling party, or that they will accept no collect calls under certain circumstances. If this is true, no announcement would be made. Alternatively, the announcement of the present invention may be supplemented by announcements to the called party as contemplated in the Daudelin arrangement, such as (1) the area code, (2) the geographic locality, or (3) the full directory number of the calling customer, in order to supply the called customer with yet further call data that he can use in order to decide whether to accept the call.

While the preceding description has focused on an embodiment of the present invention that is practiced in a switch in a local exchange network, in conjunction with a 0+ call, it is to be understood that the invention can also be practiced in a switch in an interexchange (long distance) network, in conjunction with calls placed to a predetermined 800 number that routes the calls to an interactive telecommunications services platform in the network. In such an arrangement, switch 1 may be a 4ESS™ electronic switching system available from AT&T.

When the invention is practiced in the IXC environment, it is typical that a collect call is initiated by dialing a particular 800 number (e.g., 1-800-CALL ATT). Such a call is routed by the interconnecting network 30 (in this case, the originating LEC switch) to the appropriate switch in the IXC network. A database lookup, based upon the called number, causes the call to be routed to the appropriate destination, in this case, an OSPS that has all of the capabilities as attributed to switch 1 of FIG. 1. The process followed in the control portion of the OSPS would be essentially the same as the process illustrated in FIG. 2, and any differences would be attended to by those skilled in the art. In addition, it is to be understood that a separate "call processing adjunct", which is not itself a telecommunications switch, but which is arranged to work in coordination with a switch, could provide the functionality contemplated by the present invention.

Various modifications and adaptations of the present invention will be apparent to those skilled in the art, and for that reason, it is intended that the invention be limited only by the appended claims. For example, although it is contemplated that the announcement of cost information will be made before the called party is asked to accept the charges, there are some situations in which the called party has agreed in advance to accept charges from all or certain calling parties. In that event, the announcement of the present invention may nevertheless be made, for information purposes, so that the called party can, if desired, recommend to the calling party that a different (e.g., less costly) carrier be used to place future collect calls.

What is claimed is:

1. A method for use in processing a collect call to a called party, comprising the steps of:

determining an anticipated cost for the collect call; and furnishing cost information related to the collect call to said called party, the cost information being a function of the anticipated cost of the collect call.

2. The method of claim 1 wherein the furnished cost information comprises anticipated cost savings using a first carrier relative to a second carrier.

3. The method of claim 1 wherein the furnished cost information comprises anticipated costs charged by first and second carriers.

* * * * *